United States Patent [19]
Chapdelaine et al.

[11] Patent Number: 5,326,574
[45] Date of Patent: Jul. 5, 1994

[54] CHEWING GUM UTILIZING CODRIED 3-1-MENTHOXYPROPANE-1,2-DIOL

[75] Inventors: Albert H. Chapdelaine, Naperville; Michael R. Dzija, Brookfield, both of Ill.

[73] Assignee: Wm. Wrigley Jr. Company, Chicago, Ill.

[21] Appl. No.: 90,466

[22] Filed: Jul. 12, 1993

Related U.S. Application Data

[63] Continuation of Ser. No. 807,476, Dec. 13, 1991, abandoned.

[51] Int. Cl.⁵ .............................................. A23G 3/30
[52] U.S. Cl. ........................................ 426/5; 426/96
[58] Field of Search ..................................... 426/3–6, 426/96

[56] References Cited

U.S. PATENT DOCUMENTS

| | | | |
|---|---|---|---|
| 4,070,449 | 1/1978 | Rowsell et al. | 426/3 |
| 4,157,384 | 6/1979 | Watson et al. | 426/3 |
| 4,374,123 | 2/1983 | Luecarelli et al. | 426/3 |
| 4,459,425 | 7/1984 | Amano et al. | 426/3 |
| 4,724,151 | 2/1988 | Mansukhani et al. | 426/3 |
| 4,758,438 | 7/1988 | Stroz et al. | 426/3 |
| 4,971,787 | 11/1990 | Cherukuri et al. | 426/3 |
| 4,980,177 | 12/1990 | Cherukuri et al. | 426/3 |

*Primary Examiner*—Jeanette Hunter
*Attorney, Agent, or Firm*—Willian Brinks Hofer Gilson & Lione

[57] ABSTRACT

The present invention is directed to novel chewing gums containing novel compositions comprising 3-1-menthoxypropane-1,2-diol codried with a food acceptable, water-soluble carrier.

21 Claims, No Drawings

CHEWING GUM UTILIZING CODRIED 3-1-MENTHOXYPROPANE-1,2-DIOL

This application is a continuation of application Ser. No. 07/807,476, filed Dec. 13, 1991, now abandoned.

BACKGROUND OF THE INVENTION

Several known compounds have what can be characterized as a cooling activity, and are referred to in the art as cooling agents. Cooling agents are perceived as cold or cool when contacted with the human body and, in particular, with the mucous membranes of the mouth, nose and throat. An example of one such compound is 3-1-menthoxypropane-1,2-diol, which is the subject of U.S. Pat. No. 4,459,425.

The present invention is directed to novel compositions comprising 3-1-menthoxypropane-1,2-diol codried with a food acceptable, water-soluble carrier. These compositions can be used in chewing gum to improve the "cool" sensation perceived upon chewing the gum.

SUMMARY OF THE INVENTION

The present invention is directed to novel chewing gums containing novel compositions comprising 3-1-menthoxypropane-1,2-diol codried with a food acceptable, water-soluble carrier.

In one feature of the present invention, a novel composition is provided which comprises 3-1-menthoxypropane-1,2-diol codried with a carrier. The carrier must be capable of functioning as a carrier for 3-1-menthoxypropane-1,2-diol, and be of food acceptable quality. That is, it must be suitable for human consumption. The carrier should also be water-soluble. Preferably, the carrier is selected from the group consisting of maltodextrins, modified celluloses, carbohydrate gums, sugars, sugar alcohols and mixtures thereof. More preferably, the carrier is selected from the group consisting of maltodextrins, hydroxypropylmethylcellulose, gum arabic, corn syrup solids, sorbitol and mixtures thereof. Even more preferably, the carrier comprises maltodextrin. Most preferably, the carrier comprises hydroxypropylmethylcellulose.

In another feature of the present invention, a novel chewing gum is provided comprising a codried composition comprising 3-1-menthoxypropane-1,2-diol codried with a carrier. Preferably, the chewing gum will contain an amount of the codried composition such that the 3-1-menthoxypropane-1,2-diol comprises about 0.05-0.50 wt % of the chewing gum. More preferably, 3-1-menthoxypropane-1,2-diol comprises about 0.1-0.3 wt %, and most preferably about 0.15-0.25 wt %, of the chewing gum.

In another feature of the present invention, a method of making a novel codried composition comprising 3-1-menthoxypropane-1,2-diol codried with a carrier is provided. According to this method, an aqueous dispersion of 3-1-menthoxypropane-1,2-diol and a carrier is provided. The aqueous dispersion is dried to drive-off a portion of the water thereby yielding a codried composition comprising 3-1-menthoxypropane-1,2-diol codried with a carrier. Preferably, the 3-1-menthoxypropane-1,2-diol will comprise about 5-50 wt %, and more preferably about 10-30 wt %, of the final codried product. More preferably, the aqueous dispersion of 3-1-menthoxypropane-1,2-diol and the carrier is spray dried.

In yet another feature of the present invention, a method of making a chewing gum is provided. According to this method, a novel codried composition comprising 3-1-menthoxypropane-1,2-diol codried with a carrier is mixed with chewing gum base and flavor.

DETAILED DESCRIPTION OF THE PREFERRED EMBODIMENTS

Cooling agents have a physiological cooling effect. Cooling agents can be used in foodstuffs, drinks, dentifrices, gargles, cosmetics, tobacco products, abrasives, lotions, etc. Examples of some cooling agents include menthol, 3-substituted-P-menthanes, N-substituted-P-methane-3-carboxamides and 3-1-menthoxypropane-1,2-diol. The present invention is directed in particular to 3-1-menthoxypropane-1,2-diol.

When 3-1-menthoxypropane-1,2-diol is present in chewing gum, a "coolness" or cool sensation is perceived upon chewing the gum. A relatively high level of 3-1-menthoxypropane-1,2-diol is necessary to achieve the desired coolness in chewing gum. However, where high levels of 3-1-menthoxypropane-1,2-diol are employed, the gum base tends to undergo undesirable softening. To combat this softening problem, a modified gum base may be required to accommodate relatively high levels of 3-1-menthoxypropane-1,2-diol. However, the need for a modified gum base is both inconvenient and expensive because it may require the stocking of an additional gum base. Ideally, all of a manufacturer's gum products, regardless of other ingredients, will use the same base. It has unexpectedly been discovered that the gum base softening effect caused by the addition of 3-1-menthoxypropane-1,2-diol can be reduced by codrying the 3-1-menthoxypropane-1,2-diol with a carrier prior to its addition to the chewing gum. Codrying the 3-1-menthoxypropane-1,2-diol with the carrier intimately associates these two components.

According to the present invention, 3-1-menthoxypropane-1,2-diol is codried with a carrier. Any carrier that is capable of functioning as a carrier for 3-1-menthoxypropane-1,2-diol, and suitable for human consumption is contemplated for use in the present invention. Preferably, the carrier is water soluble (i.e., the carrier is soluble in an aqueous composition comprising up to about 5 wt % carrier). Presently preferred carriers are selected from the group consisting of maltodextrins, modified celluloses, carbohydrate gums such as gum arabic, sugars such as sucrose, dextrose and lactose, sugar alcohols such as sorbitol and xylitol, and mixtures thereof. The term "modified celluloses" is essentially a term of art and includes but is not necessarily limited to hydroxypropylmethylcellulose, methylcellulose and hydroxylpropylcellulose. More preferably, the carrier is selected from the group consisting of maltodextrins, hydroxypropylmethylcellulose, gum arabic, corn syrup solids, sorbitol and mixtures thereof. The most preferred carrier is hydroxypropylmethylcellulose.

According to the present invention, an aqueous dispersion is made by first mixing in water a quantity of 3-1-menthoxypropane-1,2-diol and a quantity of the carrier. Preferably, the 3-1-menthoxypropane-1,2-diol is mixed with the carrier in a ratio of about 1:10 to 1:1. At the preferred levels, the 3-1-menthoxypropane-1,2-diol is water insoluble. A homogenizer is preferably utilized to mix the 3-1-menthoxypropane-1,2-diol and carrier such that the resulting aqueous dispersion will remain stable until the codrying step.

Once the aqueous dispersion is made, it is dried according to any method known by those skilled in the art to drive-off substantially all of the water, thereby yielding a codried composition comprising 3-1-menthoxypropane-1,2-diol codried with the carrier. Methods of drying the aqueous dispersion include but are not necessarily limited to spray drying, freeze drying and wet granulation. The preferred drying method of the present invention is spray drying.

In another feature of the present invention, the codried composition comprising 3-1-menthoxypropane-1,2-diol codried with a carrier is utilized in chewing gum to enhance the "coolness" of the gum. An amount of the codried composition is added to the chewing gum such that the 3-1-menthoxypropane-1,2-diol comprises about 0.05–0.50 wt % of the chewing gum. More preferably, 3-1 menthoxypropane-1,2-diol comprises about 0.1–0.3 wt %, and most preferably about 0.15–0.25 wt %, of the chewing gum.

In general, a chewing gum composition comprises a water-soluble bulk portion, a water-insoluble chewable gum base portion, and typically water-insoluble flavor. The water-soluble bulk portion dissipates with a portion of the flavor over a period of time during chewing. The water-insoluble gum base is retained in the mouth throughout the chew.

The water-insoluble gum base generally comprises elastomers, resins, fats and oils, waxes, softeners and inorganic fillers. Elastomers are present in an amount from about 10–30 wt % of the chewing gum base, and may include polyisobutylene, isobutylene-isoprene copolymer, styrene-butadiene rubber, as well as natural latexes such as chicle. Resins are present in an amount from about 15–30 wt % of the chewing gum base, and may include polyvinyl acetate and terpene resins. Fats and oils may also be included in an amount from about 15–40 wt % of the gum base, and include tallow, hydrogenated and partially hydrogenated vegetable oils and cocoa butter. Waxes are present in an amount from about 0.1–15 wt % of the gum base, and may include paraffin wax, microcrystalline wax, and natural waxes such as beeswax and carnauba.

The gum base typically also includes a filler component. The filler component may be calcium carbonate, magnesium carbonate, talc, dicalcium phosphate and the like, as well as mixtures thereof. The filler may constitute about 5–60 wt % of the gum base. Preferably, the filler comprises about 5–50 wt % of the chewing gum base.

The gum base typically also contains softeners and emulsifiers. Softeners may comprise about 0–15 wt % of the gum base and include but are not necessarily limited to glycerol monostearate and glycerol triacetate. Emulsifiers may comprise from about 1–10 wt % of the gum base, and include but are not necessarily limited to lecithin, fatty acid monoglycerides, triglycerides and the like, as well as mixtures thereof. Further, the gum base may also contain optional ingredients such as antioxidants, colors and pharmaceutical agents.

The insoluble gum base constitutes between about 5–95 wt % of the gum. Preferably, the insoluble gum base comprises about 10–50 wt % of the gum, and more preferably, about 20–30 wt %.

The water-soluble portion of chewing gum may comprise softeners, sweeteners, flavors and combinations thereof. The softeners are added to the chewing gum in order to optimize the chewability and mouthfeel of the gum. Softeners, also known in the art as plasticizers or plasticizing agents, generally constitute between about 0.1–15 wt % of the chewing gum. Softeners contemplated for use in the water-soluble portion of the chewing gum include glycerin, lecithin, and combinations thereof. Further, aqueous sweetener solutions such as those containing sorbitol, hydrogenated starch hydrosylates, corn syrups and combinations thereof may be used as softeners and binding agents in gum.

Sweeteners contemplated for use in chewing gum include both sugar and sugarless components. Sugar sweeteners generally include saccharide containing components, commonly known in the chewing gum art and which include but are not necessarily limited to sucrose, dextrose, maltose, dextrin, dried invert sugar, fructose, levulose, galactose, corn syrup solids and the like, alone or in any combination. Sugarless sweeteners generally include components with sweetening characteristics that are devoid of the commonly known sugars, and include but are not necessarily limited to sugar alcohols such as sorbitol, xylitol, hydrogenated starch hydrosylates, maltitol and the like, alone or in any combination. Also contemplated for direct addition to the gum are relatively faster releasing, high-intensity sweeteners such as aspartame, sucralose, acesulfame-K, alitame and saccharin. High intensity sweeteners may comprise up to about 0.6 wt % of the chewing gum.

Those skilled in the art will recognize that any combination of sugar and/or sugarless sweeteners may be employed in the chewing gum. Further, those skilled in the art will recognize a sweetener may be present in a chewing gum in whole or in part as a water-soluble bulking agent. In addition, a softener can be combined with a sweetener such as an aqueous sweetening solution.

Chewing gum also contains flavor. Flavor is present in chewing gum from about 0.1–10 wt %, and preferably from about 0.5–3 wt % of the gum. Flavors contemplated by the present invention include any liquid flavoring which is of food-acceptable quality. Such flavors may consist of essential oils, synthetic flavors, and mixtures thereof, including but not necessarily limited to oils derived from plants and fruits such as citrus fruits, fruit essences, peppermint oil, spearmint oil, clove oil, oil of wintergreen, anise, and the like. Artificial flavoring components are also contemplated by the present invention. Those skilled in the art will recognize that the natural and artificial flavors can be combined in any manner. Optional ingredients such as colors, emulsifiers, and pharmaceutical agents may be added to the chewing gum.

In general, chewing gum is manufactured by sequentially adding the various chewing gum ingredients to any mixer known in the art. After the ingredients have been thoroughly mixed, the gum mass is discharged from the mixer and shaped into the desired form such as by rolling it into sheets and cutting it into sticks, extruding it into chunks, or casting into pellets. Generally, the ingredients are mixed by first melting the gum base and adding it to the running mixer. The base may also be melted in the mixer itself. Color may also be added at this time. A softener such as glycerin may then be added next along with the syrup and a portion of the bulking agent. Further portions of the bulking agent may then be added to the mixture. It should be understood that the novel composition of 3-1-menthoxypropane-1,2-diol codried with a carrier may be added at any time during the gum manufacturing process.

5

The entire mixing procedure typically takes from about 5 to about 15 minutes, but longer mixing times may sometimes be required.

Of course, it should be understood that a wide range of changes and modifications can be made to the preferred embodiments described above. This invention is believed applicable to confectioneries other than chewing gum. It is therefore intended that the foregoing detailed description be regarded as illustrative rather than limiting, and that it be understood that it is the claims appended hereto (including all equivalents) which are intended to define the scope of this invention.

EXAMPLES

Example 1

An aqueous dispersion containing 3 wt % 3-1-menthoxypropane-1,2-diol and 10 wt % hydroxypropylmethyl cellulose (HPMC) was first prepared by using a Brinkman homogenizer. The HPMC was obtained from DOW Chemical Co. under the name K3 Premium Grade Methocell. An aqueous solution containing 10 wt % HMPC was also prepared for use in establishing optimal spray drying conditions and to equilibrate the system for 25 minutes. The spray drying apparatus utilized was a pilot scale Niro spray dryer, 54 inches in diameter and equipped with a spray nozzle. The following optimal spray drying conditions were established.

| Inlet Temperature | 190–195° C. |
| --- | --- |
| Outlet Temperature | 85–95° C. |
| Feed Rate | 98.5 ml/m |
| Pump Speed | 28 RPM |
| Feed Pressure | 60 psi |
| Feed Temperature | 23° C. |
| Atomizing Air Pressure | 38 psi |

After the 25 minute equilibration, the aqueous 3-1-menthoxypropane-1,2-diol HPMC dispersion was substituted for the HPMC solution and the run was continued until the feed material was exhausted (about 40 minutes). A sample of the spray dried composition was analyzed and found to contain 15.85 wt % 3-1-menthoxypropane-1,2-diol versus 23 wt % theoretical. The measured level is different than theoretical due to the occurrence of one or more of the following possibilities. A portion of the 3-1-menthoxypropane-1,2-diol could have volatilized during the spray drying process. The 3-1-menthoxypropane-1,2-diol may not be uniformly distributed in the codried composition and the test sample contained a proportionately low amount of 3-1-menthoxypropane-1,2-diol. Thus, when extrapolating to determine the level of 3-1-menthoxypropane-1,2-diol in the codried composition, an erroneously low number was calculated. Finally, the different readings may simply be the result of analytical error.

Example 2

A second spray dried 3-1-menthoxypropane-1,2-diol sample was prepared as in Example 1 except that the feed material was an aqueous dispersion containing 3 wt % 3-1-menthoxypropane-1,2-diol and 30 wt % maltodextrin obtained from National Starch Co. under the name N-LOK. Several adjustment to the spray drying process disclosed in Example 1 were made to optimize conditions for the new system:

| Inlet Temperature | 190–200° C. |
| --- | --- |
| Outlet Temperature | 95–100° C. |
| Feed Rate | 92.7 ml/min |
| Feed Pressure | 40 psi |

The run continued until the feed material was exhausted (about 25 minutes). The final spray dried product contained 11.98 wt % 3-1-menthoxypropane-1,2-diol versus 9 wt % theoretical. The difference in the actual level of 3-1-menthoxypropane-1,2-diol versus theoretical could be due to the occurrence of one of the following possibilities. As may have occurred in Example 1, the 3-1-menthoxypropane-1,2-diol may not be uniformly distributed in the codried composition. However, in this example, the test sample may have contained a proportionately high level of 3-1-menthoxypropane-1,2diol. Thus, an erroneously high number was arrived at when extrapolating to determine the level of 3-1-menthoxypropane-1,2-diol in the codried composition. Alternatively, analytical error could be responsible for the difference in the measured level of 3-1-menthoxypropane-1,2-diol and theoretical.

Example 3

Three batches of Wintergreen flavored gum were prepared according to the formulations below. The release rates of the codried 3-1-menthoxypropane-1,2-diol composition of examples 1 and 2 were tested.

| Ingredients (wt %) | Gum 1 | Gum 2 | Gum 3 |
| --- | --- | --- | --- |
| Sugar | 52.74 | 51.75 | 53.325 |
| Base | 24.00 | 24.00 | 24.00 |
| Corn Syrup | 12.00 | 12.0 | 12.00 |
| Glucose Monohydrate | 8.00 | 8.00 | 8.00 |
| Wintergreen Flavor Blend | 1.50 | 1.50 | 1.50 |
| Glycerin | 1.00 | 1.00 | 1.00 |
| Spray Dried 3-1-menthoxypropane-1,2-diol/HPMC (Ex. 1) | 0.76 | — | — |
| Spray Dried 3-1-menthoxypropane-1,2-diol/Maltodextrin (Ex. 2) | — | 1.75 | — |
| TCA (Neat) | — | — | 0.175 |
| | 100.00 | 100.00 | 100.00 |

Gum 1 utilized 3-1-menthoxypropane-1,2-diol spray codried with HPMC according to the method of Example 1. Gum 2 utilized 3-1-menthoxypropane-1,2-diol spray codried with maltodextrin according to the method of Example 2. Gum 3 utilized untreated 3-1-menthoxypropane-1,2-diol.

The three gums were tested by a screening panel comprised of several experienced gum sensory panelists. Gum 2 was found to have the fastest coolness impact on chewing. Gum 1 had somewhat of a delayed coolness impact.

Example 4

Three batches of sugarless spearmint flavored gum were prepared according to the formulations below. The release rates of the codried 3-1-menthoxypropane-1,2-diol compositions of Examples 1 and 2 were tested.

| Ingredients (wt %) | Gum 4 | Gum 5 | Gum 6 |
| --- | --- | --- | --- |
| Sorbitol | 46.426 | 46.274 | 46.825 |
| Gum Base | 25.73 | 25.73 | 25.73 |
| Mannitol | 14.00 | 14.00 | 14.00 |

-continued

| Ingredients (wt %) | Gum 4 | Gum 5 | Gum 6 |
| --- | --- | --- | --- |
| Glycerin | 10.00 | 10.00 | 10.00 |
| Spearmint Flavor | 1.78 | 1.78 | 1.78 |
| Aspartame | 0.29 | 0.29 | 0.29 |
| Lecithin | 0.50 | 0.50 | 0.50 |
| Distilled Water | 0.80 | 0.80 | 0.80 |
| Spray Dried 3-1-menthoxypropane-1,2-diol/ HPMC (Ex. 1) | 0.474 | — | — |
| Spray Dried 3-1-menthoxypropane-1,2-diol/ Maltodextrin (Ex. 2) | — | −.626 | — |
| TCA (Neat) | — | — | 0.075 |
| | 100.00 | 100.00 | 100.00 |

Gum 4 utilized 3-1-menthoxypropane-1,2-diol spray codried with HPMC according to the method of Example 1. Gum 5 utilized 3-1-menthoxypropane-1,2-diol spray dried with maltodextrin according to the method of Example 2. Gum 6 utilized untreated 3-1-menthoxypropane-1,2-diol.

A panel of five expert evaluators compared the three samples in open discussion. The five panelists were unaware of the nature of the gum samples, but were instructed to concentrate on the cooling effect of the gums. Gum 4 was judged to have the fastest release and the highest peak cooling followed by Gum 5, and then Gum 6.

From the foregoing examples, it can be concluded that the gums containing 3-1-menthoxypropane-1,2-diol codried with a carrier have a superior coolness release and peak intensity compared to prior art gums containing untreated 3-1-menthoxypropane-1,2-diol.

We claim:

1. A chewing gum which is free of the undesireable gum base softening effect associated with the use of 3-1-menthoxypropane-1,2-diol comprising 3-1-menthoxypropane-1,2-diol codried with a carrier.

2. The chewing gum of claim 1 wherein the carrier is selected from the group consisting of maltodextrins, modified celluloses, carbohydrate gums, sugars, sugar alcohols and mixtures thereof.

3. The chewing gum of claim 1 wherein the carrier is selected from the group consisting of maltodextrins, hydroxypropylmethylcellulose, gum arabic, corn syrup solids, sorbitol and mixtures thereof.

4. The chewing gum of claim 3 comprising about 0.05-0.5 wt % 3-1-menthoxypropane-1,2-diol.

5. The chewing gum of claim 4 wherein the carrier comprises maltodextrin.

6. The chewing gum of claim 3 wherein the carrier comprises hydroxypropylmethylcellulose.

7. A chewing gum which is free of the undesireable gum base softening effect associated with the use of 3-1-menthoxypropane-1,2-diol comprising a codried composition comprising about 5-50 wt % 3-1-menthoxypropane-1,2-diol codried with a carrier selected from the group consisting of maltodextrins, hydroxypropylmethyl cellulose, gum arabic, corn syrup solids, sorbitol and mixtures thereof.

8. A method of making a codried composition comprising 3-1-menthoxypropane-1,2-diol comprising the following steps:
providing an aqueous dispersion comprising a quantity of 3-1-menthoxypropane-1,2-diol and a quantity of a carrier; and
codrying the aqueous dispersion.

9. The method of claim 8 wherein the carrier is selected from the group consisting of maltodextrins, modified celluloses, carbohydrate gums, sugars, sugar alcohols and mixtures thereof.

10. The method of claim 9 wherein the carrier is selected from the group consisting of maltodextrins, hydroxypropylmethylcellulose, gum arabic, corn syrup solids, sorbitol and mixtures thereof.

11. The method of claim 10 wherein the codried composition comprises about 5-50 wt % 3-1-menthoxypropane-1,2-diol.

12. The method of claim 1 wherein the carrier comprises maltodextrin.

13. The method of claim 11 wherein the carrier comprises hydroxypropylmethylcellulose.

14. A method of making a codried composition comprising 3-1-menthoxypropane-1,2-diol comprising the following steps:
providing an aqueous dispersion comprising a quantity of 3-1-menthoxypropane and a quantity of a carrier selected from the group consisting of maltodextrins, modified celluloses, carbohydrate gums, sugars, sugar alcohols and mixtures thereof; and
codrying the aqueous dispersion such that the final codried composition comprises about 5-50 wt % 3-1-menthoxypropane-1,2-diol.

15. A method of making a chewing gum which is free of the undesireable gum base softening effect associated with the use of 3-1-menthoxypropane-1,2-diol comprising the following steps:
providing a quantity of chewing gum base;
providing a quantity of flavor;
providing a quantity of a codried composition comprising 3-1-menthoxypropane-1,2-diol codried with a carrier; and
mixing the chewing gum base, flavor and the codried composition.

16. The method of claim 15 wherein the carrier is selected from the group consisting of maltodextrins, modified celluloses, carbohydrate gums, sugars, sugar alcohols and mixtures thereof.

17. The method of claim 15 wherein the carrier is selected from the group consisting of maltodextrins, hydroxypropylmethylcellulose, gum arabic, corn syrup solids, sorbitol and mixtures thereof.

18. The method of claim 17 wherein the codried composition comprises about 0.05-0.5 wt % 3-1-menthoxypropane-1,2-diol .

19. The method of claim 18 wherein the carrier comprises maltodextrin.

20. The method of claim 18 wherein the carrier comprises hydroxypropylmethylcellulose.

21. A method of making a chewing gum which is free of the undesireable gum base softening effect associated with the use of 3-1-menthoxypropane-1,2-diol comprising the following steps:
providing a quantity of chewing gum base;
providing a quantity of flavor;
providing a quantity of a codried composition comprising about 5-50 wt % 3-1-menthoxypropane-1,2-diol codried with a carrier selected from the group consisting of maltodextrins, modified celluloses, carbohydrate gums, sugars, sugar alcohols and mixtures thereof.

* * * * *

UNITED STATES PATENT AND TRADEMARK OFFICE
CERTIFICATE OF CORRECTION

PATENT NO. : 5,326,574
DATED : July 5, 1994
INVENTOR(S) : Chapdelaine, et al.

It is certified that error appears in the above-indentified patent and that said Letters Patent is hereby corrected as shown below:

Column 8,

In Claim 12, line 1, delete "1" and substitute --11--.

Signed and Sealed this

Seventh Day of March, 1995

Attest:

BRUCE LEHMAN

Attesting Officer

Commissioner of Patents and Trademarks